Figure 1:
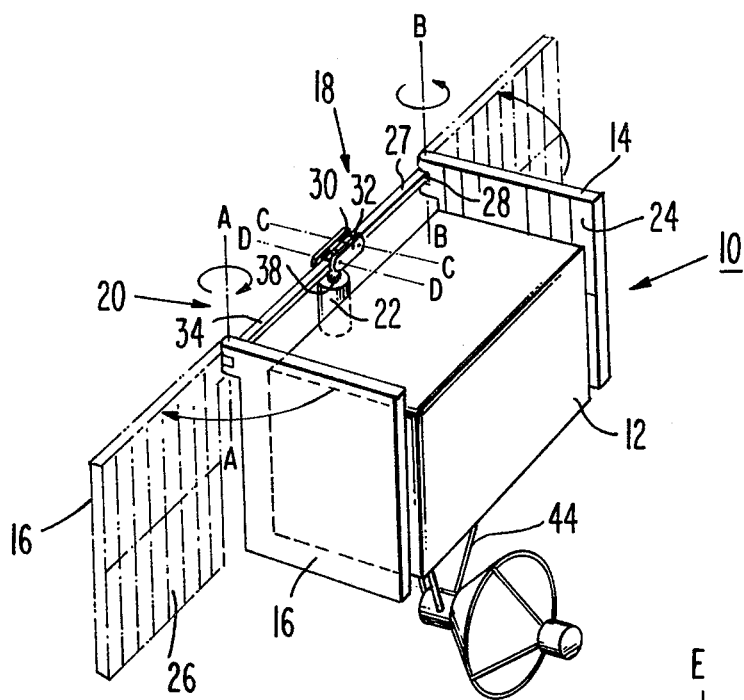

United States Patent [19]

Anchutin

[11] 4,133,502
[45] Jan. 9, 1979

[54] PLURAL PANELS DEPLOYED EFFECTIVELY AS A SINGLE PANEL

[75] Inventor: Andrew Anchutin, Titusville, N.J.

[73] Assignee: RCA Corporation, New York, N.Y.

[21] Appl. No.: 782,036

[22] Filed: Mar. 28, 1977

[51] Int. Cl.² .............................................. B64G 1/10
[52] U.S. Cl. .................................................. 244/173
[58] Field of Search .............................. 244/173, 159; 136/89 SA

[56] References Cited

U.S. PATENT DOCUMENTS 3,412,955  11/1968  Vilbig ................................... 244/173
3,620,846  11/1971  Paine et al. ......................... 244/173 X Primary Examiner—Barry L. Kelmachter
Attorney, Agent, or Firm—H. Christoffersen; Samuel Cohen; William Squire

[57] ABSTRACT

A plurality of arrays of solar cells are symmetrically stored about a spacecraft during launch to provide symmetrical loading. When the spacecraft is in operational configuration, the solar arrays are deployed adjacent each other on one side of the spacecraft to effectively form a single array and the single array may be oriented to face the sun by a common drive mechanism.

2 Claims, 2 Drawing Figures

U.S. Patent     Jan. 9, 1979     4,133,502

PLURAL PANELS DEPLOYED EFFECTIVELY AS A SINGLE PANEL

The present invention relates to deployable arrays of solar cells which are suitable, for example, for providing power to a spacecraft.

During the launch of a spacecraft, the array(s) of solar cells which later will be employed to supply power to various equipments on the craft, are stored inside the nose faring of the launch vehicle. In one known system employing two arrays, they are symmetrically stowed to provide uniform loading to the launch vehicle. After the spacecraft reaches a desired position, the solar arrays are unfolded from their stowed positions to their unfolded, deployed positions on diametrically opposite sides of the spacecraft and oriented to face the sun. In a second known system, because there is no room available to position two arrays of solar cells on opposite sides of the spacecraft (other equipment such as antennas, sensors and so on already occupy the space), only a single array is employed. It is stowed in asymmetric fashion and this is undesirable because it requires a greater balance weight to correct the asymmetrical condition. This single array later is deployed to a position on one side of the aircraft.

In apparatus embodying the present invention a plurality of arrays are employed which are symmetrically stowed during the launch, and which are later deployed to positions adjacent each other on one side of the spacecraft to form a combined array which operates like a single enlarged array.

Figure 2:
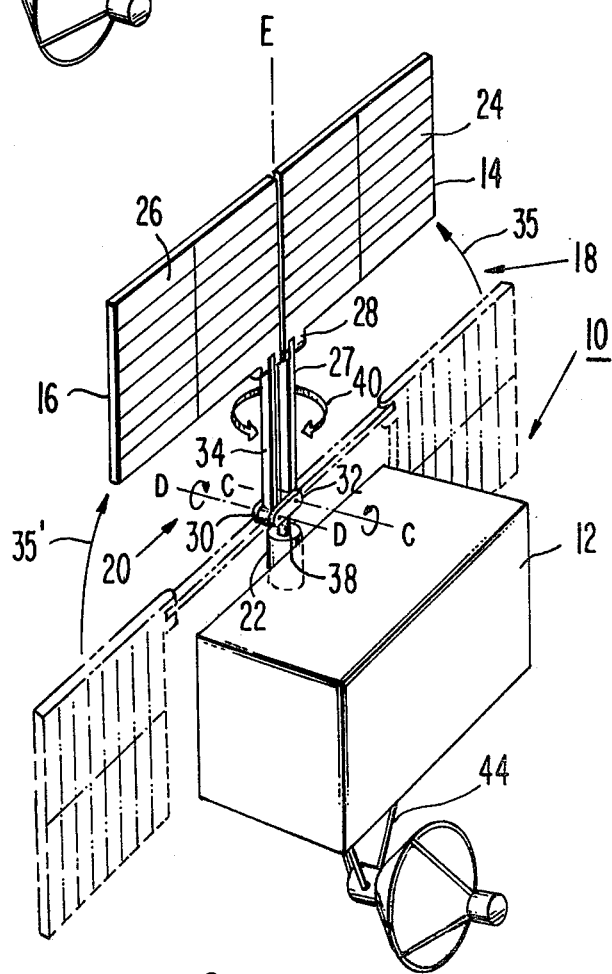

In the Drawing:

FIG. 1 is an isometric view of a spacecraft utilizing two solar cell arrays in the folded, stowed position in accordance with an embodiment of the present invention, and FIG. 2 is an isometric view showing the solar cell arrays of FIG. 1 in the deployed position.

In FIG. 1 spacecraft 10 includes spacecraft body 12 to which are mounted two identical solar cell arrays 14 and 16. Array 14 is secured to motor 22 via deployment linkage 18 and array 16 is secured to motor 22 via deployment linkage 20. Linkages 18 and 20 are both rotatable about axis E—E, FIG. 2, by common drive motor 22 which is secured to body 12. Linkages 18 and 20 are mirror images of each other and only one need be described.

Each of the solar arrays 14 and 16 comprises a plurality of interconnected solar cells mounted on surfaces 24 and 26, respectively. The cells themselves and their manner of interconnection to form an array are known in the art. The arrays 14 and 16 shown by way of example to be rectangular, may be of any convenient shape. For example, an array such as 14 or 16 may, if desired, consist of a group of panels, interconnected to one another in accordian fashion, so that when they are later deployed they will unfold to form a single large array.

Linkage 18 includes arm 27 which is pivotally mounted at end 28 to array 14 for rotation about axis B-B. The other end 30 of arm 27 is pivotally mounted to central link 32 for rotation about axis C—C. This latter rotation moves array 14 in direction 35, FIG. 2, until it is in the upright position as shown. The connections of arm 27 to array 14 and to link 32 include well known preloaded spring hinges equipped with viscous dampers (not shown) at each pivot location. Array 14 is held in the stowed position, FIG. 1, by suitable restraining latches (not shown) connected to body 12 and remotely operated. Array 16 is connected to link 32 via arm 34 and suitable spring loaded hinges and viscous dampers (not shown) at the ends of arm 34 in a manner similar to that described for arm 27.

Arms 27 and 34 are secured to the drive shaft 38 of motor 22 via link 32. Motor 22 is energized by suitable control means (not shown) activated either by a remote ground control command signal or by an internally generated preprogrammed signal on board the spacecraft body 12. Motor 22 rotates the drive shaft 38 about axis E—E, FIG. 2, direction 40 to align the arrays with the sun.

Array 16 is rotated about axis A—A at one end of rod 34 and about axis D—D at the other end simultaneously with the pivoting of array 14 until positioned in the upright position, illustrated in FIG. 2. As shown in FIG. 2, arrays 14 and 16 together form a substantially uniform co-planar plural array configuration operating effectively as a single array. The one-sided positioning of the arrays 14 and 16 with respect to the spacecraft body 12 is necessitated by the presence of antenna 44 on the side of the spacecraft body 12. Ordinarily only a single array is provided such a spacecraft arrangement.

In the embodiment shown, the arrays are deployed on command from a ground-station or an internally programmed signal which releases the restraining latches (not shown). The preloaded springs then are free to unfold the arrays 14 and 16 from the stowed position of FIG. 1 to the deployed position of FIG. 2. The viscous dampers (not shown) control the speed at which the array are unfolded. While two arrays are shown, more than two can be provided.

What is claimed is:

1. In a spacecraft,
   first and second plane solar arrays symmetrically stored on the spacecraft and lying in two planes during a stored position of said arrays,
   first and second elongated link arms, each arm coupled at one end to said spacecraft and each arm coupled at the other end to one of said arrays, each said arm having a storage first position and a second position in which the two arms are adjacent to one another and side-by-side, the two arms lying in a common plane in both said first and second positions, said arrays, when in said stored position, being at an angle to said common plane, and each array being coupled to one of said link arms in such a way that each said array can be driven from said stored position to a position in said common plane,
   means for rotating said arrays with respect to said link arms to move said arrays from said stored position to said position in said common plane, and
   means for rotating said arms from said first position to said second position to thereby rotate both arrays to said position in which said arrays are in said common plane and in which an edge of one array is adjacent to a corresponding edge of the other array so that the two arrays can operate as a single array asymmetrically positioned on the spacecraft.

2. In the spacecraft of claim 1 further including drive means fixed to the spacecraft in a position intermediate said arrays, when the arrays are in said stored position, said drive means being coupled to said one end of each said arm and being capable of driving said arrays when said arrays are deployed from said stored position.

* * * * *